United States Patent
Galvan et al.

(10) Patent No.: US 9,567,418 B2
(45) Date of Patent: Feb. 14, 2017

(54) MULTIMODAL COPOLYMERS OF PROPYLENE AND 1-HEXENE

(71) Applicant: BASELL POLIOLEFINE ITALIA S.R.L., Milan (IT)

(72) Inventors: Monica Galvan, Ferrara (IT); Andreas Neumann, Ferrara (IT); Caroline Cathelin, Ferrara (IT); Francesca Tisi, Ferrara (IT); Giampaolo Pellegatti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/032,694

(22) PCT Filed: Sep. 24, 2014

(86) PCT No.: PCT/EP2014/070322
§ 371 (c)(1),
(2) Date: Apr. 28, 2016

(87) PCT Pub. No.: WO2015/062787
PCT Pub. Date: May 7, 2015

(65) Prior Publication Data
US 2016/0251463 A1    Sep. 1, 2016

(30) Foreign Application Priority Data
Oct. 30, 2013 (EP) ..................... 13190896

(51) Int. Cl.
*C08F 210/06* (2006.01)
*C08J 5/18* (2006.01)
*C08L 23/14* (2006.01)

(52) U.S. Cl.
CPC ............... *C08F 210/06* (2013.01); *C08J 5/18* (2013.01); *C08J 2323/14* (2013.01); *C08L 23/14* (2013.01)

(58) Field of Classification Search
CPC ... C08F 210/06; C08F 210/14; C08F 2500/05; C08F 2500/12; C08F 2500/20
USPC ........................................ 526/348.5
See application file for complete search history.

(56) References Cited

U.S. PATENT DOCUMENTS

| | | | |
|---|---|---|---|
| 9,243,137 B2 | 1/2016 | Reichelt et al. | |
| 2011/0104416 A1 | 5/2011 | Bernreitner et al. | |
| 2011/0315264 A1* | 12/2011 | Bernreitner ........... | C08F 210/06 138/177 |
| 2013/0090436 A1 | 4/2013 | Balestra et al. | |
| 2014/0079899 A1 | 3/2014 | Bernreitner et al. | |

FOREIGN PATENT DOCUMENTS

| | | |
|---|---|---|
| CN | 101675104 A | 3/2010 |
| CN | 103347951 A | 10/2013 |
| EP | 2186834 A1 | 5/2010 |

OTHER PUBLICATIONS

PCT International Search Report Mailed December 10, 2014 (Dec. 10, 2014) for Corresponding PCT/EP2014/070322.

* cited by examiner

*Primary Examiner* — Ling Choi
*Assistant Examiner* — Chun-Cheng Wang

(57) ABSTRACT

The present disclosure relates to a propylene-1-hexene copolymer having:
i) a content of 1-hexene derived units ranging from 0.6 wt % to 3.0 wt %;
ii) a melt flow rate (MFR) measured according to the method ISO 1133 (230° C., 5 kg) ranging from 0.5 g/10 min to 5.0 g/10 min;
iii) a polydispersity (PI) ranges from 4.5 to 10 and the distribution of molecular weight is of multimodal type;
iv) a melting point ranging from 160° C. to 145° C.; and
v) a differential scanning calorimetry (DSC) curve (temperature/heat of fusion) that shows at least two peaks.

5 Claims, 2 Drawing Sheets

MULTIMODAL COPOLYMERS OF PROPYLENE AND 1-HEXENE

This application is the U.S. National Phase of PCT International Application PCT/EP2014/070322, filed Sep. 24, 2014, claiming benefit of priority to European Patent Application No. 13190896.4, filed Oct. 30, 2013, the contents of which are incorporated herein by reference in its entirety.

FIELD OF THE INVENTION

The present invention relates to multimodal copolymers of propylene and 1-hexene having a content of 1-hexene derived units ranging from 0.6 wt % to 3.0 wt % that may be used for the production of industrial sheets.

BACKGROUND OF THE INVENTION

Copolymers of propylene and hexene-1 having a low 1-hexene content are known in the art. WIPO Pat. App. Pub. No. WO 2006/002778 relates to a random polymer of propylene and 1-hexene containing from 0.2 to 5 wt % of recurring units derived from hexene-1. The propylene-hexene-1 polymer exhibits a broad molecular weight distribution of a monomodal type.

WIPO Pat. App. Pub. No. WO 2009/083500 relates to plastic tanks made from propylene copolymers of propylene and hexene-1. The 1-hexene derived units range from 0.5 wt % to 5 wt %. This document is silent regarding the modality of the copolymers; however, the copolymer exemplified has a distribution of the monomodal type.

SUMMARY OF THE INVENTION

An object of the present disclosure relates to a propylene-1-hexene copolymer having a multimodal distribution of molecular weight and improved mechanical properties, such as improved flexural modulus.

In some embodiments, the disclosure relates to a propylene-hexene-1 copolymers having;

i) a content of 1-hexene derived units ranging from 0.6 wt % to 3.0 wt %; such as from 0.7 wt to 2.0 wt and from 0.8 wt to 1.5 wt;

ii) a melt flow rate (MFR) measured according to the method ISO 1133 (230° C., 5 kg) ranging from 0.5 g/10 min to 5.0 g/10 min, including from 0.6 g/10 min to 4.0 g/10 min and from 0.7 g/10 min to 2.0 g/10 min;

iii) a polydispersity index (PI) ranging from 4.5 to 10; such as from 4.5 to 6;

iv) a melting point ranging from 145-160° C.; including from 147-155° C. and from 150-153° C.;

v) the DSC curve (temperature/heat of fusion) shows at least two peaks.

DETAILED DESCRIPTION OF THE INVENTION

Figure 1:
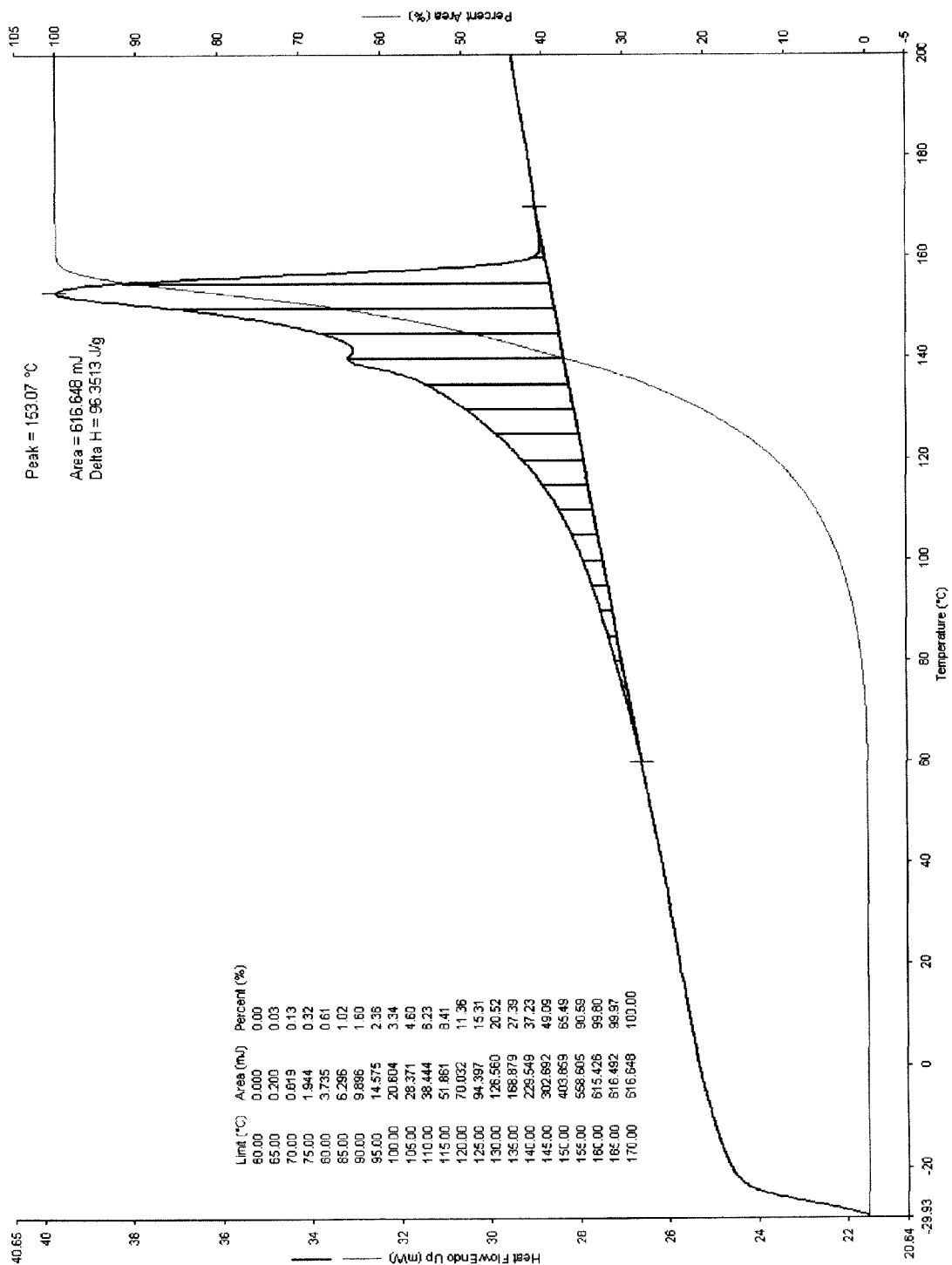
FIG. 1 is a DSC thermogram of the propylene-1-hexene copolymer of Example 1.
Figure 2:
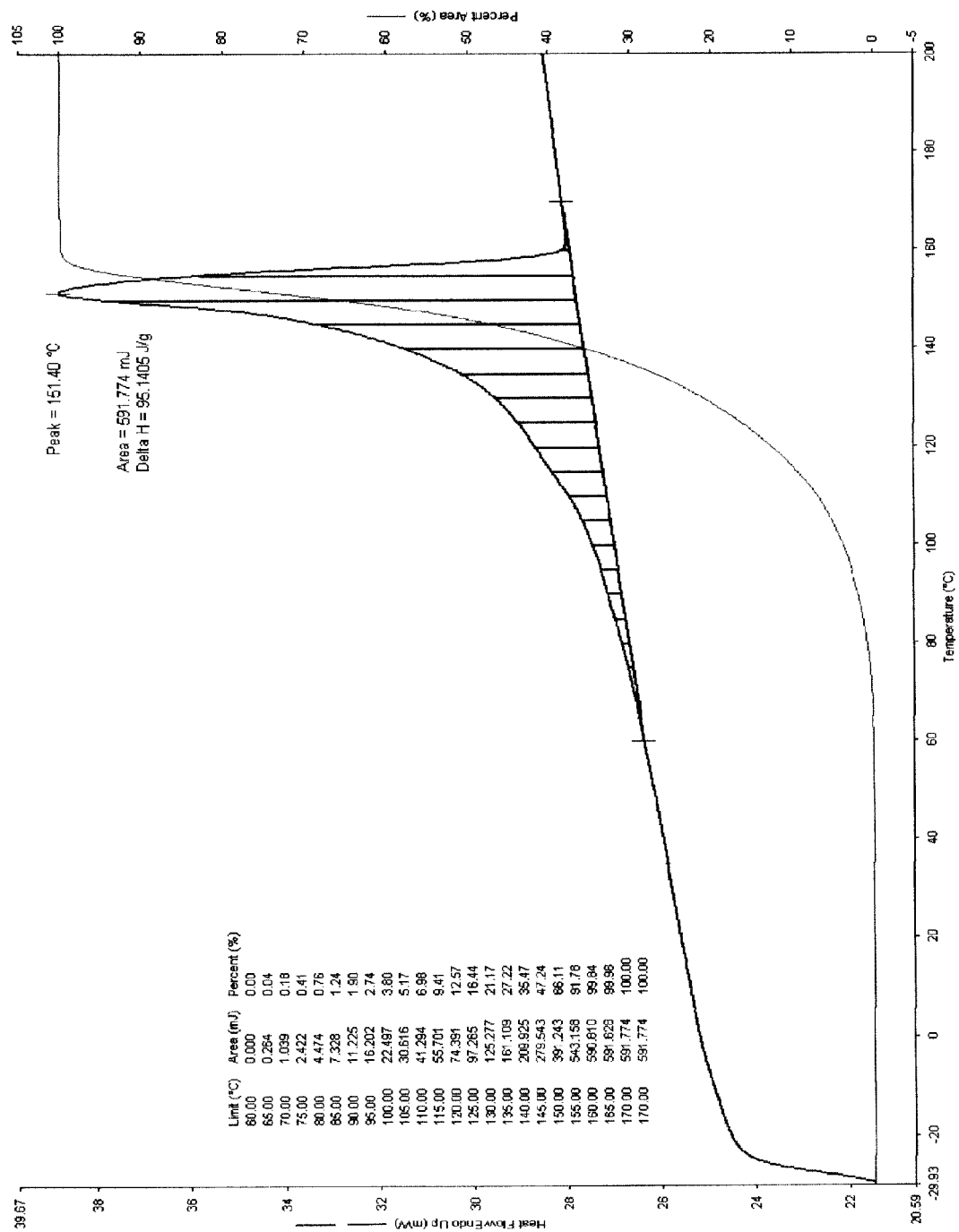
FIG. 2 is a DSC thermogram of the propylene-1-hexene copolymer of Comparative Example 2.

By "molecular weight distribution of multimodal type," it is meant that there are at least two peaks in the DSC curve (e.g. temperature/heat of fusion). A peak is defined as a point on the DSC curve (temperature/heat of fusion) having the highest value of heat of fusion at a temperature A with respect to the values of heat of fusion in the range ±1° C. with respect to temperature A.

The propylene-hexene-1 copolymer of the present disclosure in endowed with improved flexural modulus with respect to a copolymer having a monomodal distribution. In some embodiments, the flexural modulus is higher than 1350 MPa and the IZOD is higher than 26 kJ/m$^2$; including higher than 28 kJ/m$^2$.

The properties described herein render the propylene-1-hexene beneficial for applications such as the production of industrial sheets. An industrial sheet is defined as a sheet having a thickness greater than 0.1 mm; such as greater than 0.3 mm.

A further object of the present technology relates to an industrial sheet comprising the propylene-1-hexene of the disclosure.

The propylene-hexene-1 polymers of the present disclosure can be prepared by polymerizing propylene and 1-hexene in the presence of highly stereospecific heterogeneous Ziegler-Natta catalysts.

The Ziegler-Natta catalysts suitable for producing the propylene polymer of the invention may comprise a solid catalyst component comprising at least one titanium compound having at least one titanium-halogen bond and at least an electron-donor compound (internal donor), both supported on magnesium chloride ($MgCl_2$). The Ziegler-Natta catalysts systems further comprise an organo-aluminum compound as a co-catalyst and optionally an external electron-donor compound.

Suitable catalysts systems are described in the EP Pat. Doc. Nos. EP45977, EP361494, EP728769, EP 1272533 and in WIPO Pat. App. Pub. No. WO00/63261.

In certain embodiments, the solid catalyst component comprises Mg, Ti, halogen and an electron donor selected from esters of phthalic acids as disclosed in EP Pat. Doc Nos. EP45977, such as diisobutylphathalate, dihexylphthalate or diethylphthalate and mixtures thereof.

According to one embodiments, the solid catalyst component can be prepared by reacting a titanium compound of formula $Ti(OR)_{n-y}X_y$, where n is the valence of titanium and y is a number between 1 and n, such as $TiCl_4$, with a magnesium chloride deriving from an adduct of the formula $MgCl_2 \cdot pROH$, where p is a number between 0.1 and 6, such as from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The resulting adduct can be directly reacted with the Ti compound or it can be subjected to thermal controlled dealcoholation (80-130° C.) so as to obtain an adduct in which the number of moles of alcohol is generally lower than 3, such as between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the internal donor is used in a molar ratio with respect to the $MgCl_2$ of from 0.01 to 1, such as from 0.05 to 0.5. The preparation of catalyst components in spherical form is described for example in EP Pat. Doc. EP-A-395083 and in WIPO Pat. App. Pub. No. WO98/44001. In certain embodiments, the solid catalyst components obtained according to the above method contain the titanium compound, expressed as Ti, in an amount from 0.5 to 10% by weight.

Moreover, they show a surface area (by B.E.T. method) generally between 20 and 500 $m^2/g$, including between 50 and 400 $m^2/g$, and a total porosity (by B.E.T. method) higher than 0.2 $cm^3/g$, such as between 0.2 and 0.6 $cm^3/g$. The porosity (Hg method) due to pores with radius up to 10,000 Å generally ranges from 0.3 to 1.5 $cm^3/g$, preferably from 0.45 to 1 $cm^3/g$.

The organo-aluminum compound is may be an alkyl-Al selected from the trialkyl aluminum compounds such as triethylaluminum, triisobutylaluminum, tri-n-butylaluminum, tri-n-hexylaluminum and tri-n-octylaluminum. It is also possible to use mixtures of trialkylaluminums with alkylaluminum halides, alkylaluminum hydrides or alkylaluminum sesquichlorides such as $AlEt_2Cl$ and $Al_2Et_3Cl_3$.

The Al-alkyl compound may be used in such a quantity that the Al/Ti ratio is from 1 to 1000.

In some embodiments, external electron-donor compounds for use in the present technology include silicon compounds, ethers, esters such as ethyl 4-ethoxybenzoate, amines, heterocyclic compounds and 2,2,6,6-tetramethyl piperidine, ketones and 1,3-diethers. Another class of external donor compounds is that of silicon compounds of formula $R_a^5R_b^6Si(OR^7)_c$, where a and b are integers from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Non-limiting examples of these compounds are methylcyclohexyldimethoxy silane, diphenyldimethoxysilane, methyl-t-butyldimethoxysilane, dicyclopentyldimethoxysilane, 2-ethylpiperidinyl-2-t-butyldimethoxysilane, 1,1,1-trifluoropropyl-2-ethylpiperidinyl-dimethoxysilane and 1,1,1-trifluoropropyl-metil-dimethoxysilane. In further embodiments, the external electron donor compound is used in such an amount as to give a molar ratio between the organo-aluminum compound and the electron donor compound of from 0.1 to 500.

The Ziegler-Natta catalysts that can be used to produce a propylene polymer of the present disclosure include solid catalyst components comprising a magnesium halide, a titanium compound having at least a Ti-halogen bond as above described and at least two electron donor compounds, one selected from succinates and the other from 1,3 diethers.

The catalysts generally used in the process of the disclosure are capable of producing polypropylene with a value of xylene insolubility at ambient temperature greater than 90% by weight, preferably greater than 95% by weight.

The propylene-hexene-1 polymers of the present disclosure are produced by a polymerization process carried out in a gas-phase polymerization reactor comprising at least two interconnected polymerization zones.

The process according to the polymerization process for use in the present technology is illustrated in EP Pat. Doc. 782 587.

In certain embodiments, the process is carried out in a first and second interconnected polymerization zones into which propylene and hexene-1 are fed in the presence of a catalyst system and from which the resulting polymer is discharged. In said process the growing polymer particles flow upward through one (first) of the said polymerization zones (riser) under fast fluidisation conditions, leave said riser and enter another (second) polymerization zone (downcomer) through which they flow downward in a densified form under the action of gravity, leave the downcomer and are reintroduced into the riser, thus establishing a circulation of polymer between the riser and the downcomer.

In the downcomer, high density values of the solid are reached that approach the bulk density of the polymer. A positive gain in pressure can be obtained along the direction of flow, so that it becomes possible to reintroduce the polymer into the riser without the help of special mechanical means. In this way, a "loop" circulation is set up, which is defined by the balance of pressures between the two polymerization zones and by the head loss introduced into the system.

Generally, the condition of fast fluidization in the riser may be established by feeding a gas mixture comprising the relevant monomers to the riser. In certain embodiments, the feeding of the gas mixture is effected below the point of reintroduction of the polymer into the riser by the use, where appropriate, of gas distributor means. The velocity of transport gas into the riser is higher than the transport velocity under the operating conditions, such as from 2 to 15 m/s.

In some embodiments, the polymer and the gaseous mixture leaving the riser may be conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate, with the addition of make-up monomers and/or molecular weight regulators, to the riser. The transfer can be carried out by means of a recycle line for the gaseous mixture.

The control of the polymer circulation between the two polymerization zones can be carried out by metering the amount of polymer leaving the downcomer using means suitable for controlling the flow of solids, such as mechanical valves.

The operating parameters, such as the temperature, are those that are usual in olefin polymerization process, for example from 50-120° C.

The operating pressures can range between 0.5 and 10 MPa, such as between 1.5 and 6 MPa.

Optionally, one or more inert gases, such as nitrogen or an aliphatic hydrocarbon, are maintained in the polymerization zones, in such quantities that the sum of the partial pressures of the inert gases is, in certain embodiments, between 5 and 80% of the total pressure of the gases.

The various catalysts are fed up to the riser at any point of the riser. However, they can also be fed at any point of the downcomer. The catalyst can be in any physical state, therefore catalysts in either solid or liquid state can be used.

In order to obtain a distribution of molecular weight of multimodal type the gas composition in the two reactor legs has been differentiated by using the "barrier" feed according to what described in EP Pat. Doc. No. 1 012 195 so that in the two zones the concentration of hydrogen is different.

The propylene-hexene-1 copolymers of the disclosure may also be blended with any other additives commonly employed in the art, such as antioxidants, light stabilizers, heat stabilizers, phenolic antioxidants, slip agents such as calcium stearate and any other nucleating agents selected among talc, aromatic carboxylic salts, salts of monocarboxylic or polycarboxylic acids, e.g. sodium benzoate, aluminum tert-butylbenzoate or dicetyl peroxydicarbonate.

EXAMPLES

The following examples are given to illustrate the present invention without limiting purpose.

The data relating to the propylene copolymers of the examples are determined by way of the methods reported below.

Melting Temperature and Crystallization Temperature: Determined by differential scanning calorimetry (DSC). 6±1 mg of a sample is heated to 220±1° C. at a rate of 20° C./min and kept at 220±1° C. for 2 minutes in a nitrogen stream and cooled at a rate of 20° C./min to 40±2° C. and kept at this temperature for 2 min to crystallize the sample. Then, the sample is again fused at a temperature rise rate of 20° C./min up to 220° C.±1. The second melting scan is recorded, a thermogram is obtained, and temperatures corresponding to peaks are read.

Melt Flow Rate: Determined according to the method ISO 1133 (230° C., 5 kg).

Solubility in xylene: Determined as follows.

2.5 g of polymer and 250 ml of xylene are introduced in a glass flask equipped with a refrigerator and a magnetic stirrer. The temperature is raised in 30 minutes up to the boiling point of the solvent. The resulting clear solution is then kept under reflux and stirring for further 30 minutes. The closed flask is kept for 30 minutes in a bath of ice and water and in thermostatic water bath at 25° C. for 30 minutes. The resulting solid is filtered on quick filtering paper. 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

1-hexene content: Determined by $^{13}$C-NMR spectroscopy.

NMR Analysis.

$^{13}$C NMR spectra are acquired on an AV-600 spectrometer operating at 150.91 MHz in Fourier transform mode at 120° C. The peak of the propylene CH was used as internal reference at 28.83. The $^{13}$C NMR spectrum is acquired using the following parameters:

| | |
|---|---|
| Spectral width (SW) | 60 ppm |
| Spectrum centre (O1) | 30 ppm |
| Decoupling sequence | WALTZ 65_64p1 |
| Pulse program | ZGPG |
| Pulse Length (P1) | for 90° |
| Total number of points (TD) | 32 K |
| Relaxation Delay | 15 s |
| Number of transients | 1500 |

The total amount of 1-hexene as molar percent is calculated from diad using the following relations:

$$[P]=PP+0.5PH$$

$$[H]=HH+0.5PH$$

Assignments of the $^{13}$C NMR spectrum of propylene/1-hexene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Polydispersity Index (PI):

Determined at a temperature of 200° C. using a parallel plates rheometer model RMS-800 marketed by RHEOMETRICS (USA), operating at an oscillation frequency which increases from 0.1 rad/sec to 100 rad/sec. From the crossover modulus one can derive the polydispersity index (P.I.) by way of the equation:

$$P.I.=10^5/Gc$$

in which Gc is the crossover modulus, defined as the value (expressed in Pa) at which G'=G", wherein G' is the storage modulus and G" is the loss modulus.

Samples for mechanical measurements have been obtained according to ISO 294-2, unless differently indicated.

IZOD Impact Strength: Determined according to ISO 180/1A.

Flexural modulus: Determined according to ISO 178.

Example 1 and Comparative Example 2

Propylene-hexene-1 polymers are prepared by polymerizing propylene and hexene-1 by polymerizing propylene and hexene-1 in the presence of a catalyst under continuous conditions in a plant comprising a polymerization apparatus as described in EP Pat. Doc. No. 1 012 195.

In the presence of a catalyst under continuous conditions in a plant comprising a precontact section, a prepolymerization section and a polymerization apparatus that comprises two interconnected cylindrical reactors, a riser and a downcomer. Fast fluidization conditions are established in the riser by feeding gas recycled from the gas-solid separator.

In Example 1 the gas composition in the two reactor legs has been differentiated by using the "barrier" feed according to EP Pat. Doc. No. 1 012 195. The stream comprises propylene fed in the larger upper part of the downcomer. In Comparative Example 2, the barrier feed was not used.

The catalyst employed comprises a catalyst component prepared according to

Example 5 of EP Pat. Doc. No. EP-A-728769 but using microspheroidal $MgCl_2.1.7C_2H_5OH$ instead of $MgCl_2.2.1C_2H_5OH$. The catalyst component is mixed with dicyclopentyl dimethoxy silane (DCPMS) as an external donor and with triethylaluminum (TEAL) in the pre-contact section. The catalyst system is then subjected to pre-polymerization before introducing it into the polymerization apparatus.

The polymer particles exiting the reactor are subjected to a steam treatment to remove the reactive monomers and volatile substances and then dried. The polymer particles are extruded with a usual packing of stabilizers.

The main operative conditions of the polymerization process are indicated in Table 1.

Some of the main properties of the polymer are reported in Table 2.

TABLE 1

| Examples | | 1 | 2* |
|---|---|---|---|
| PRECONTACT TEMPERATURE | ° C. | 15 | 15 |
| PRECONCTAT RESIDENCE TIME | MIN | 11 | 11 |
| TEA/SOLID CATALYST COMPONENT | G/G | 8 | 8 |
| TEA/DCPMS, | G/G | 4 | 4 |
| PREPOLYMERIZATION TEMPERATURE | ° C. | 25 | 25 |
| PREPOLYMERIZATION RESIDENCE TIME | MIN | 5 | 5 |
| POLYMERIZATION TEMPERATURE | ° C. | 80 | 80 |
| PRESSURE | BAR-G | 23 | 23 |
| $C_6/(C_3 + C_6)$, mol/mol | Riser | 0.011 | 0.011 |
| $C_6/(C_3 + C_6)$, mol/mol | Downcomer | 0.011 | 0.011 |
| $H_2/C_3^{--}$, mol/mol | Riser | 0.001 | 0.001 |
| $H_2/C_3^{--}$, mol/mol | Downcomer | 50 ppm H2 | 0.001 |

$H_2$ = hydrogen;
$C_3$ = propylene;
$C_6$ = 1-hexene
*comparative

TABLE 2

| | Clean Specification | |
|---|---|---|
| Examples | 1 | 2* |
| Polydispersity Index (PI) | 5 | 4 |
| 1-hexene content, wt % | 1.1 | 1.1 |

TABLE 2-continued

| | Clean Specification | |
|---|---|---|
| Examples | 1 | 2* |
| MFR, g/10 min | 1.1 | 1.2 |
| Melting Temperature, ° C. | 153 | 152 |
| Xylene-soluble content, wt % | 2.5 | 2.5 |
| Flexural modulus MPa | 1520 | 1400 |
| Izod 23° C. $kJ/m^2$ | 30 | 24 |
| Izod 0° C. $kJ/m^2$ | 8 | 5 |

*comparative

By comparing Example 1 with Comparative Example 2, it is clear that the Izod is improved along with the flexural modulus.

What is claimed is:

1. A propylene-1-hexene copolymer having:
   i) a content of 1-hexene derived units ranging from 0.6 wt % to 3.0 wt %;
   ii) a melt flow rate (MFR) measured according to the method ISO 1133 (230° C., 5 kg) ranging from 0.5 g/10 min to 5.0 g/10 min;
   iii) a polydispersity index (PI) ranging from 4.5 to 10 where the distribution of molecular weight is of a multimodal type;
   iv) a melting point ranging from 145–160° C.; and
   v) a differential scanning calorimetry (DSC) curve (temperature/heat of fusion) that shows at least two peaks.

2. The propylene-hexene-1 copolymer according to claim 1, wherein the content of 1-hexene derived units ranges from 0.7 wt % to 2.0 wt %.

3. The propylene-hexene-1 copolymer according to claim 1, wherein the melt flow rate (MFR) measured according to the method ISO 1133 (230° C., 5 kg) ranges from 0.6 g/10 min to 4.0 g/10 min.

4. The propylene-hexene-1 copolymer according claim 1, wherein the melting point ranges from 147-155° C.

5. An industrial sheet comprising the propylene-1-hexene copolymer of claim 1.

* * * * *

UNITED STATES PATENT AND TRADEMARK OFFICE
CERTIFICATE OF CORRECTION

| | |
|---|---|
| PATENT NO. | : 9,567,418 B2 |
| APPLICATION NO. | : 15/032694 |
| DATED | : February 14, 2017 |
| INVENTOR(S) | : Monica Galvan et al. |

Page 1 of 1

It is certified that error appears in the above-identified patent and that said Letters Patent is hereby corrected as shown below:

On the Title Page

| | | |
|---|---|---|
| Column 2, (57) | Line 8 | After "polydispersity", insert --index-- |

In the Specification

| | | |
|---|---|---|
| Column 1 | Line 43 | Delete "0.7 wt to 2.0 wt and from 0.8 wt to 1.5 wt;" and insert --0.7 wt % to 2.0 wt % and from 0.8 wt % to 1.5 wt %;-- |
| Column 1 | Line 53 | Delete "the DSC" and insert --a differential scanning calorimetry (DSC)-- |
| Column 2 | Line 12 | After "propylene-1-hexene", insert --copolymer-- |
| Column 2 | Line 18 | After "propylene-1-hexene", insert --copolymer-- |
| Column 3 | Line 36 | Delete "methylcyclohexyldimethoxy silane," and insert --methylcyclohexyldimethoxysilane,-- |
| Column 3 | Line 40 | Delete "1,1,1,trifluoropropyl-metil-dimethoxysilane." and insert --1,1,1,trifluoropropyl-methyl-dimethoxysilane.-- |
| Column 6, | Line 59 | After "to", delete "¶" |
| Column 7 | Table 1, Line 3 | Delete "PRECONCTAT" and insert --PRECONTACT-- |
| Column 7 | Table 1, Line 7 | Delete "TEA/DCPMS," and insert --TEA/DCPMS-- |
| Column 7 | Table 1, Line 18 | Delete "H2" and insert --$H_2$-- |

In the Claims

| | | |
|---|---|---|
| Column 8 | Line 23 | In Claim 1, after "10", insert --,-- |
| Column 8 | Line 35 | In Claim 4, after "according", insert --to-- |

Signed and Sealed this
Twenty-fourth Day of September, 2019

Andrei Iancu
*Director of the United States Patent and Trademark Office*